United States Patent
Marshall

(10) Patent No.: US 11,492,888 B2
(45) Date of Patent: Nov. 8, 2022

(54) DOWN-HOLE GAS SEPARATION METHODS AND SYSTEM

(71) Applicant: Modicum, LLC, Gardendale, TX (US)

(72) Inventor: Gary V. Marshall, Gardendale, TX (US)

(73) Assignee: MODICUM, LLC, Gardendale, TX (US)

( * ) Notice: Subject to any disclaimer, the term of this patent is extended or adjusted under 35 U.S.C. 154(b) by 99 days.

(21) Appl. No.: 17/066,201

(22) Filed: Oct. 8, 2020

(65) Prior Publication Data

US 2021/0108498 A1    Apr. 15, 2021

Related U.S. Application Data

(60) Provisional application No. 62/912,588, filed on Oct. 8, 2019.

(51) Int. Cl.
*E21B 43/38*    (2006.01)
*E21B 43/08*    (2006.01)
*B01D 19/00*    (2006.01)

(52) U.S. Cl.
CPC .............. *E21B 43/38* (2013.01); *E21B 43/08* (2013.01); *B01D 19/0042* (2013.01)

(58) Field of Classification Search
CPC ........ E21B 43/38; E21B 43/08; E21B 43/385; B01D 19/0042
See application file for complete search history.

(56) References Cited

U.S. PATENT DOCUMENTS 1,407,873 A    2/1922   Liedbeck
1,674,815 A *  6/1928   Barnhart ............... E21B 43/121
                                                    166/265
1,973,650 A    9/1934   O'brien
2,229,541 A *  1/1941   Zublin .................... E21B 43/38
                                                    417/252
2,429,043 A    10/1947  Barnhart
(Continued)

FOREIGN PATENT DOCUMENTS

WO    WO 2018/013441 A1    1/2018

OTHER PUBLICATIONS

"X4-Sales-Brochure-0418-0.pdf", Datasheet [online], Modicum, LLC, 4 pages, Aug. 25, 2018 [retrieved on Nov. 12, 2020]. Retrieved from the Internet: <https://secureservercdn.net/198.71.233.197/0ee.e7a.myftpupload.com/wp-content/uploads/2018/06/X4-Sales-Brochure-0418-0.pdf>. Retrieved from Internet Archive Wayback Machine <https://web.archive.org/web/20180825195110/http://predatortool.com/wp-content/uploads/2018/06/X4-Sales-Brochure-0418-0.pdf>.

(Continued)

*Primary Examiner* — Steven A Macdonald
(74) *Attorney, Agent, or Firm* — Charles Knobloch

(57) ABSTRACT

A method and apparatus for separating of gas from liquids in a wellbore, the apparatus enabling the receiving of wellbore fluids into two or more production separation chambers, operating in parallel. The apparatus further enabling the receiving of production separation chamber fluids into a production pipe through a thief jet port disposed in a lower chamber beneath the production separation chambers. The apparatus further enabling extraction of bottom hole gas fluids in the wellbore from under the two or more production separation chambers and disposing the gas fluids back into the wellbore above the two or more production separation chambers.

10 Claims, 4 Drawing Sheets

(56) References Cited

U.S. PATENT DOCUMENTS

| | | | | |
|---|---|---|---|---|
| 2,525,233 | A * | 10/1950 | Miller | E21B 43/38 166/105.5 |
| 2,652,130 | A * | 9/1953 | Ferguson | E21B 43/38 137/118.06 |
| 2,883,940 | A * | 4/1959 | Gibson | E21B 43/38 166/105.5 |
| 3,128,719 | A | 4/1964 | Jongbloed et al. | |
| 3,283,570 | A | 11/1966 | Hodges | |
| 4,241,787 | A * | 12/1980 | Price | B01D 17/085 166/305.1 |
| 4,241,788 | A * | 12/1980 | Brennan | E21B 43/38 417/313 |
| 4,366,861 | A | 1/1983 | Milam | |
| 4,515,608 | A | 5/1985 | Clegg | |
| 4,531,584 | A | 7/1985 | Ward | |
| 4,676,308 | A * | 6/1987 | Chow | B01D 19/0042 96/206 |
| 5,220,962 | A | 6/1993 | Muller et al. | |
| 5,333,684 | A * | 8/1994 | Walter | E21B 43/121 166/54 |
| 5,389,128 | A | 2/1995 | Lopes | |
| 5,431,228 | A | 7/1995 | Weingarten et al. | |
| 5,653,286 | A | 8/1997 | McCoy | |
| 6,155,345 | A | 12/2000 | Lee | |
| 6,179,054 | B1 | 1/2001 | Stewart | |
| 6,228,146 | B1 * | 5/2001 | Kuespert | E21B 43/38 96/9 |
| 6,357,530 | B1 | 3/2002 | Kennedy | |
| 6,945,762 | B2 | 9/2005 | Williams | |
| 7,270,178 | B2 | 9/2007 | Selph | |
| 7,377,314 | B2 | 5/2008 | Gonzalez | |
| 7,635,030 | B2 | 12/2009 | Knight et al. | |
| 7,823,635 | B2 * | 11/2010 | Wright | E21B 43/385 166/228 |
| 9,518,458 | B2 | 12/2016 | Ellithorp et al. | |
| 9,909,400 | B2 | 3/2018 | Ellithorp et al. | |
| 10,385,672 | B2 | 8/2019 | Zahran | |
| 10,436,008 | B2 * | 10/2019 | Marshall | E21B 43/082 |
| 10,570,720 | B2 | 2/2020 | Marshall | |
| 10,907,462 | B2 * | 2/2021 | Marshall | F04B 47/12 |
| 2005/0081718 | A1 | 4/2005 | Carruth | |
| 2007/0114020 | A1 | 5/2007 | Brekke | |
| 2009/0266755 | A1 | 10/2009 | Fenton | |
| 2010/0147514 | A1 | 6/2010 | Swaringin | |
| 2013/0032341 | A1 | 2/2013 | Raglin | |
| 2014/0158343 | A1 | 6/2014 | Cobb et al. | |
| 2016/0138380 | A1 | 5/2016 | McCoy | |
| 2018/0023379 | A1 * | 1/2018 | Marshall | E21B 43/38 210/294 |
| 2018/0187531 | A1 | 7/2018 | Ellithorp et al. | |
| 2018/0280834 | A1 * | 10/2018 | Marshall | B01D 19/00 |
| 2019/0055809 | A1 | 2/2019 | Ellithorp | |
| 2019/0085677 | A1 | 3/2019 | Marshall | |
| 2019/0085678 | A1 * | 3/2019 | Marshall | B01D 19/0042 |
| 2020/0141224 | A1 | 5/2020 | Marshall | |
| 2020/0291762 | A1 | 9/2020 | Ellithorp | |
| 2020/0308943 | A1 | 10/2020 | Ellithorp | |
| 2021/0108498 | A1 | 4/2021 | Marshall | |

OTHER PUBLICATIONS

"X4-Sales-Brochure-0518-0.pdf", Datasheet [online], Modicum, LLC, 2 pages, Aug. 25, 2018 [retrieved on Nov. 12, 2020]. Retrieved from the Internet: <https://secureservercdn.net/198.71.233.197/0ee.e7a.myftpupload.com/wp-content/uploads/2018/06/X4-Sales-Brochure-0518-0.pdf>. Retrieved from Internet Archive Wayback Machine <https://web.archive.org/web/20180825202902/http://predatortool.com/wp-content/uploads/2018/06/X4-Sales-Brochure-0518-0.pdf>.

"predatortool.com webpage of Aug. 6, 2018", Web page <http://predatortool.com>, 9 pages, Aug. 6, 2018, retrieved from Internet Archive Wayback Machine < https://web.archive.org/web/20180806040932/http://predatortool.com/> on Nov. 11, 2020.

"Silver_Product_PDF_WhaleShark.pdf", Datasheet [online], Silver Energy, 2 pages, Mar. 2021 [retrieved on Jun. 7, 2021]. Retrieved from the Internet: <https://silverenergy.com/wp-content/uploads/2021/03/Silver_Product_PDF_WhaleShark.pdf>.

McCoy, J.N. et al, "An improved downhole gas separator," Petroleum Society of Canada Annual Technical Meeting, Jun. 14-18, 1999, paper No. PETSOC-99-66 (Abstract). https://www.onepetro.org/conference-paper/PETSOC-99-66, retrieved Nov. 24, 2014.

Lackner, G., et al, "Effect of Viscosity on Downhole Gas Separation in a Rotary Gas Separator," SPE Production & Facilities (2002) 17(3):184-191, (Summary). https://www.onepetro.org/journal-paper/SPE-79076-PA, Summary retrieved Nov. 24, 2014.

McCoy, James N. et al, "A Laboratory Study With Field Data of Downhole Gas Separators," SPE Production & Operations (2007) 22(1), (Summary). https://www.onepetro.org/journal-paper/SPE-96619-PA, retrieved Nov. 24, 2014.

Bohorquez, R.R., et al, "Laboratory Testing of Downhole Gas Separators," SPE Annual Technical Conference and Exhibition, Nov. 11-14, 2007, SPE-109532, (Abstract). https://www.onepetro.org/conference-paper/SPE-109532-MS, retrieved Nov. 24, 2014.

Weingarten, J.S., et al, "Development and Testing of a Compact Liquid-Gas Auger Partial Separator for Downhole or Surface Applications," SPE Production & Facilities (1997) 12(1):34-40, (Summary). https://www.onepetro.org/journal-paper/SPE-30637-PA, retrieved Nov. 24, 2014.

Konylinski, L.S., et al, "Development and Field Test Results of an Efficient Downhole Centrifugal Gas Separator," Journal of Petroleum Technology (1985) 37(7):1295-1304, (Summary). https://www.onepetro.org/journal-paper/SPE-11743-PA, retrieved Nov. 24, 2014.

Schmoe, W. P., "Bottom-hole Gas Separators Increase Production," API Drilling and Production Practice (Jan. 1958), API-58-042, (Abstract). https://www.onepetro.org/conference-paper/API-58-042, retrieved Nov. 24, 2014.

Clegg, J.D., "Understanding and Combating Gas Interference in pumping wells," Drilling and Production Practice (Jan. 1963), API-63-149, (Abstract). https://www.onepetro.org/conference-paper/API-63-149, retrieved Nov. 24, 2014.

Podio, A.L., et al, "Evaluation and Performance of Packer-Type Downhole Gas Separators," SPE Production and Operations Mar. 23-26, 2013, SPE-164510, (Abstract). https://www.onepetro.org/conference-paper/SPE-164510-MS.

Podio, A.L., et al, "Decentralized Continuous-flow Gas Anchor," Journal of Canadian Petroleum Technology (1996) 35(7), (Abstract). https://www.onepetro.org/journal-paper/PETSOC-96-07-03, retrieved Nov. 24, 2014.

Evolution Oil Tools Inc, "Beam Pump Gas Separator", http://eotools.com/pdfs/6/Beam%20Gas%20Separator_Rev.E0_22-Sep-11.pdf, retrieved Oct. 24, 2018.

Evolution Oil Tools Inc, "Beam Gas Separator", htps://eotools.com/images/pdfs/222-10-case_history_rev-a%20beam%20gas%20separator.pdf. retrieved Oct. 24, 2018.

PCT/IB/373, International Preliminary Report on Patentability, PCT/US2017/041283, International Filing Date Jul. 9, 2017.

PCT/ISA/210, International Search Report, PCT/US2017/041283, International Filing Date Jul. 9, 2017.

PCT/ISA/237, Written Opinion of the International Searching Authority, PCT/US2017/041283, International Filing Date Jul. 9, 2017.

* cited by examiner

DOWN-HOLE GAS SEPARATION METHODS AND SYSTEM

CROSS REFERENCE TO RELATED APPLICATIONS

This application claims the benefit of U.S. Provisional Application No. 62/912,588 of filing date Oct. 8, 2019.

TECHNICAL FIELD

Disclosed herein are improvements to down-hole gas separation method, apparatus, and system.

BACKGROUND ART

In the current state of the art, pumping fluids in low pressure wellbores has the propensity to produce large pockets of gas, over 20 foot columns, and gas-lock a pump, preventing production. In essence, fluid is pumped up from a fluid retrieving section of the bottom hole assembly. As the pumped fluid is "sucked" up the production tube, gas separates from the fluid and bubbles to the top of the fluid column. Eventually, enough gas separates and rises to the top of the fluid column that a pump becomes gas locked and can no longer pump. The pump must stop pumping and wait for the gas to dissipate before it can resume pumping.

There is a strong need to separate gas from production fluids in the wellbore so that only liquids are pumped, thus preventing gas locking of the well and providing more liquid returns from the pump.

BRIEF DESCRIPTION OF THE SEVERAL DRAWINGS

DISCLOSURE OF THE INVENTION

Figure 1:
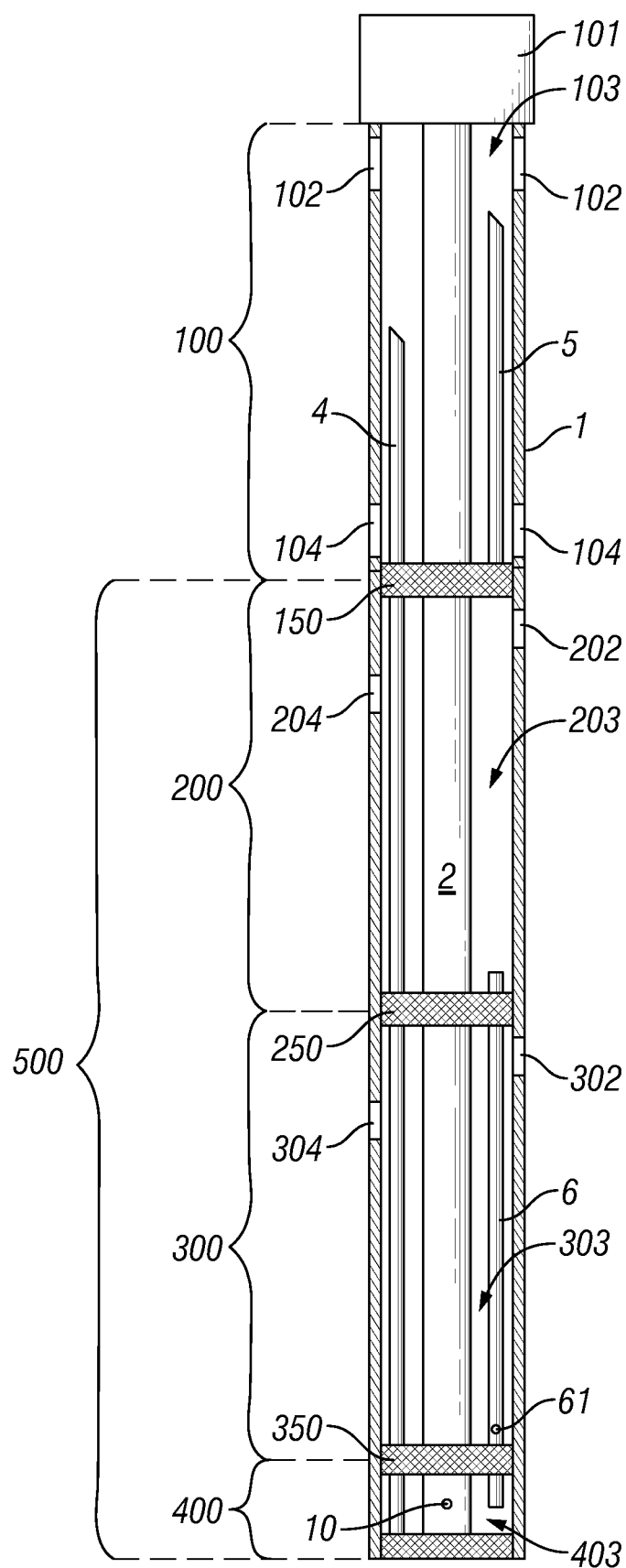
FIG. 1 illustrates a side cross-section view of an example of a 2-1 unit attached beneath a Pressure Loss Cylinder having a top make-up.

FIG. 1 illustrates a side cross-section view of an example of a 2-1 unit attached beneath a Pressure Loss Cylinder having a top make-up.

FIG. 1 illustrates a cut-away view detail of a pressure loss cylinder in an upright, vertical position of a gas separation system. In this example, shown is an assembly of a pressure loss cylinder 100 atop two stacked production separation cylinders 200, 300 stacked on a bottom cylinder 400. The production separation cylinders are isolation chambers. In one example, a make-up 101 is attached to the top of pressure loss cylinder 100. In this example, there is a pipe 1 having a production tube 2 running vertically inside the pipe 1, along the longitudinal vertical axis of the pipe 1. The production tube 2 and the pipe 1 form annular regions 103, 203, 303, 403 between the exterior of the production tube 2 and the interior wall of the pipe 1. The interior annular regions 103, 203, 303, 403 between the production tube and the pipe, in this example, is divided into four stacked chambers 100, 200, 300 400 along the longitudinal vertical axis of the pipe and production tube (which, in one example, is also a pipe). The topmost chamber, also called a cylinder in this example, is called the pressure loss cylinder 100. Pressure loss cylinder 100 serves to accumulate formation fluids, which, in one example, are isolated formation fluids that have been transported to and dumped into pressure loss cylinder 100. In one example, the combination of pipe 1 enclosing production tube 2 is called a shrouded production pipe, with pipe 1 being called the shroud.

In one example, the cylinders are isolated by annular rings 150, 250 350 disposed vertically between the pipe 1 and production tube 2, forming a barrier to control the vertical flow between the annual regions 103, 203, 303.

In the pressure loss cylinder 100, there are orifices or openings 102 in the wall of the pipe 1. These openings 102 open the interior annular region 103 to the annular region that is between the exterior of the pipe 1 and the walls of the well bore. In one example, one or more openings 102 are positioned near the top of the pressure loss cylinder 100 and another set of one or more openings 104 are positioned near the bottom of the pressure loss cylinder 100. The top openings 102 is/are for gas exhaust. The bottom openings 104 is/are for gas-removed liquids to exhaust. This delivery method puts liquid in the well bore annulus below the gas and causes upward lift.

There are also transport tubes 4, 5 6 that run vertically in the interior annular regions between the production tube 2 and the pipe 1. One or more transport tubes 4 have an end positioned to terminate about midway vertical length of the pressure loss cylinder 100. These one or more transport tubes 4 run down through the bottommost cylinder 400, where the other end of the transport tube 4 is positioned so it may be connected to additional separation cylinders below (not illustrated in this FIG. 1). Another set of one or more transport tubes 5 have an end positioned near the top of the pressure loss cylinder 100. These one or more transport tubes 5 run down to the next lower cylinder 200 of the four cylinders that are illustrated, with the other end of the transport tube 5 positioned to open into the top of that next lower cylinder 200. The next lower cylinder 200 is called a production cylinder.

The next lower cylinder 200, along with the next lower cylinder 300, also a production cylinder, (the second and third and fourth cylinders from the top in this illustration) are together called a 2-1 unit 500. A 2-1 unit 500 is also called a For the two production cylinders of the 2-1 unit, another type of transport tube 6, also called a feed tube, has one open end positioned at the bottom of the upper cylinder 200 of the 2-1 unit. Transport tube 6, in this example as illustrated, runs inside the annular region between the production tube 2 and the pipe 1. The transport tube 6 runs vertically downward into the bottommost fourth cylinder 400, where the other end of transport tube 6 is positioned. In this example as illustrated, the lower end of transport tube 6 opens within the fourth cylinder. Notice that transport tube 4 goes through annular space of the fourth cylinder 400, but does not open into the annular space. Instead, transport tube 4 traverses downward to have the option of adding, stacking, another 2-1 unit or units beneath this first, illustrated 2-1 unit 500. In this positioning of transport tube 4, the lower end of transport tube 4 would open into the topmost cylinder of another 2-1 unit (not illustrated in this FIG. 1, shown in FIG. 2).

In transport tube 6 there is a hole or orifice or opening 61, positioned towards the bottom of the lower cylinder 300 of the 2-1 unit 500. Hole or orifice or opening 61 is called a feed tube port.

In each of the two cylinders 200, 300 of the 2-1 unit 500, in one example, there are orifices or openings 202, 204, 302, 304 in the wall of pipe 1. These openings 202, 204, 302, 304 open the interior annular regions to the annular region that is between the exterior of the pipe and the walls of the well bore. In the example, as illustrated, one set of one or more openings 202, 302 are positioned near the top of each of the two cylinders of the 2-1 unit 500. In the example, as illustrated, there is another set of one or more openings 204, 304 that are positioned lower, beneath the first set of open or more openings 202, 302.

The production tube 2 runs in bottommost cylinder 400 and has an orifice or opening 10 positioned in cylinder 400. This orifice or opening 10 is called a thief jet.

In this structural configuration, the two gas separator cylinders 200, 300 of the 2-1 unit 500 share a thief jet (10). Thus, two cylinders feed one thief jet.

In operation, a gas-liquid mix of fluids enter openings 304 of the lower cylinder 300 of the 2-1 unit. If some degassing occurs, and there are two sets of one or more openings 302, 304 vertically offset in the lower cylinder 300 of the 2-1 unit 500, then the upper set of one or more openings 302 will preferentially outflow the gas that is accumulating in the lower cylinder 300 of the 2-1 unit 500. The lower set of one or more openings 304 will preferentially be the inflow of gas-liquid mix of fluids from the wellborn annulus into the cylinder annulus 303.

Since the production tube 2 is drawing negative pressure by the well pump, fluids will flow into the transport or feed tube 6 orifice 61 near the bottom of the lower cylinder 300 of the 2-1 unit 500. Liquids will fall into the bottommost fourth cylinder 400 and be drawn into the thief jet 10. Likewise, the upper cylinder 200 of the 2-1 unit 500 will operate in a similar manner, feeding liquids into the top end of transport tube 6 that is positioned near the bottom of the upper cylinder 200 of the 2-1 unit 500. By positioning and arranging into the 2-1 unit configuration, the intake cross-sectional area is doubled so that the fluid velocity required to supply liquids to the thief jet 10 is halved.

Gasses will exit the top end of transport tube 5, which is positioned near the top of the pressure loss cylinder 100, allowing the gas to further exit through top openings 102 of the pressure loss cylinder 100. In one example, reduced-gas or gas-free liquids accumulate in pressure loss cylinder 100 and are returned to the wellborn above the one or more 2-1 units 500 that are stacked below the pressure loss cylinder through one or more orifices 91 that are positioned near the bottom of the pressure loss cylinder 100. In one example, those sets of one or more openings 104 that are positioned near the bottom of the pressure loss cylinder 100, these ports or openings 104 are restricted to create a continuous fluid column in the pressure loss cylinder 100.

Thus, double the flow rate is accomplished by stacking two gas separator cylinders, drawing in fluids in parallel. At the same time, the pressure loss cylinder serves to manage expelling of gas (like a chimney effect), making use of as much vertical distance as practical. Likewise, the fluids are provided with a long downward path to provide more time for the gas to separate and liquid to go to the bottom. This effective lengthening of the vertical fall distance is aided by placing a single thief jet 10 at the very bottom of the three cylinder stack (the 2-1 unit of two cylinders 200, 300 and the bottom cylinder 400 containing the thief jet 10).

In one example, there is only one pressure loss cylinder on each downhole separator tool and the pressure loss cylinder is positioned at the top, above all other separator cylinders. In one example, multiple 2-1 units are deployed under the pressure loss cylinder, stacked downward along the production tube. In one example, only the topmost 2-1 unit has a pressure loss cylinder above it (for example, directly).

In one example, the pressure loss cylinder has a length of approximately eight feet (8'). In one example, the lengths of the production cylinders vary.

Figure 2:
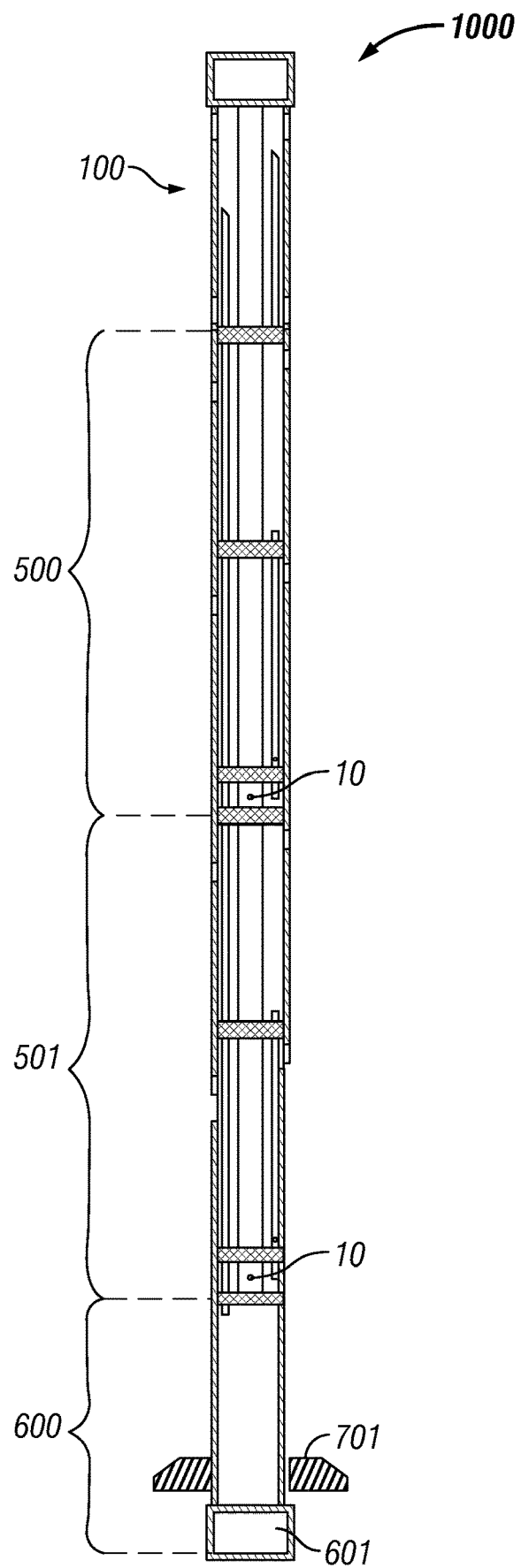
FIG. 2 illustrates a side cross section view of an example of a configured gas separator tool having a top Pressure Loss Cylinder, two stacked 2-1 units, and a feed cylinder with bottom make-up. A packer is also located around the tool.

FIG. 2 illustrates a side cross section view of an example of a configured gas separator tool assembly 1000 having a top Pressure Loss Cylinder 100, two stacked 2-1 units 500, 501, and a feed cylinder 600 with bottom make-up 601. A packer 701 is also located around the tool 1000. The packer 701 is attached towards the bottom of the feed cylinder, to be deployed in the wellborn annulus. This indicates that the fluids in the wellbore annulus above the packer 701 are isolated from the fluids in the well bore annulus below the packer 701, except through the circuitous route through the 2-1 units 500, 501 through the thief jets, to meet in the production tube.

In one example, the overall length of the tool assembly 1000 is sixty-six feet (66').

Figure 3:
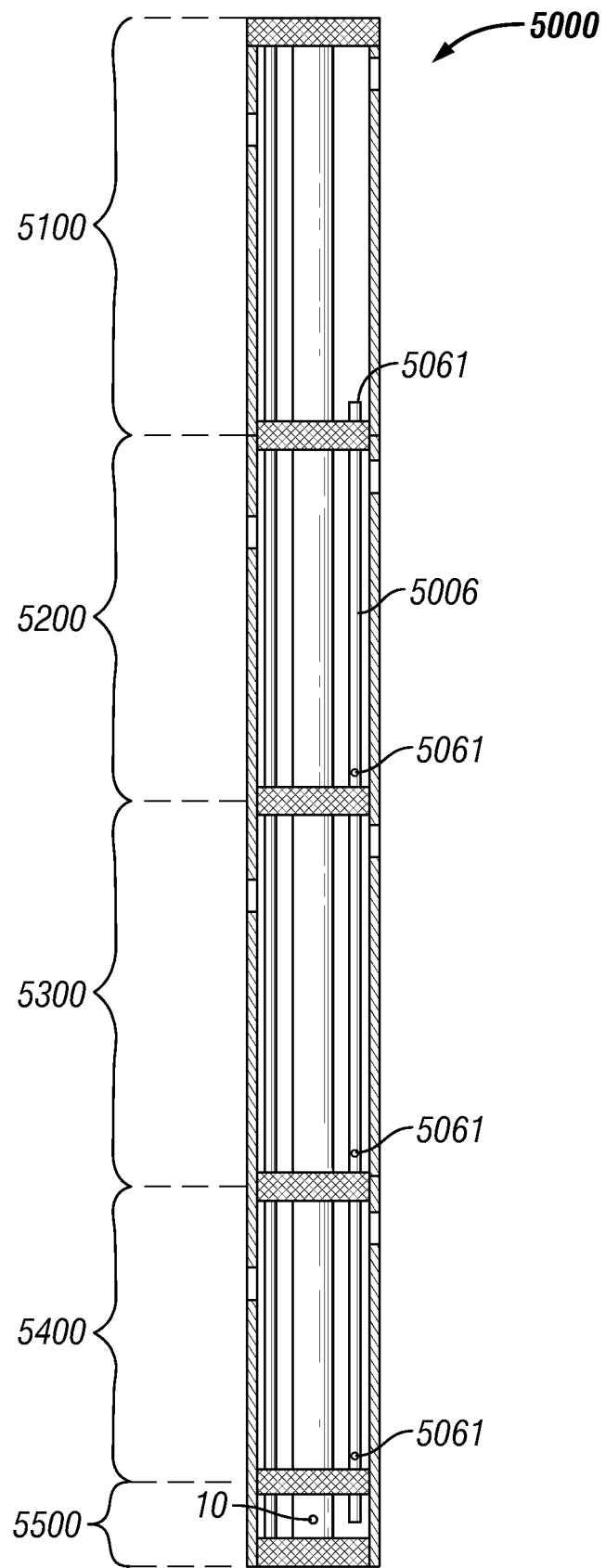
FIG. 3 illustrates a side cross section view of an example of a 4-1 unit to be attached beneath a Pressure Loss Cylinder.

FIG. 3 illustrates a side cross section view of an example of a 4-1 unit 5000. In one example the 4-1 unit 5000 is placed where a 2-1 unit would be disposed in a stack (eg, between a top pressure loss cylinder and a feed cylinder). In this example configuration, four production cylinders 5100, 5200, 5300, 5400 (instead of two) share (supply) a common thief jet 10. In one example, the length varies. A series of feed tube ports 5061 in feed tube 5006 are positioned near the bottom of each of the four production cylinders 5100, 5200, 5300, 5400.

In one example, not illustrated, multiple 4-1 units are stacked down the production tube having a selected total length and a selected individual length. In one example, the length of each 4-1 unit (or 2-1 unit, if 2-1 units are used instead or if a combination of 4-1 units and 2-1 units are used) has a selected pattern of lengths of each. In one example, the lengths are the same for each type (4-1 unit, 2-1 unit) used.

Figure 4:
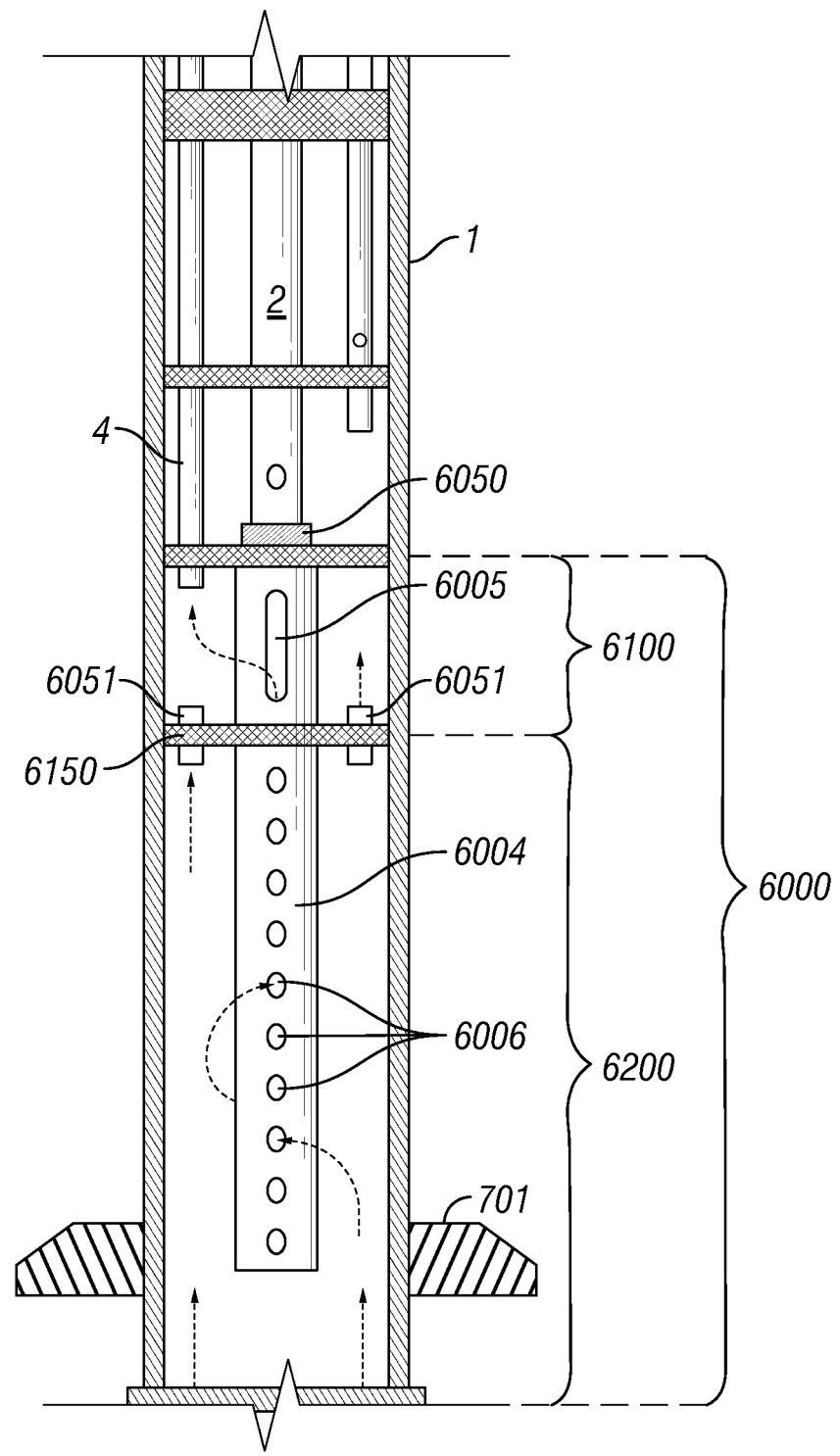
FIG. 4 illustrates a side cross section view of an example of a feed cylinder with a particulate filter.

FIG. 4 illustrates the use of a feed cylinder assembly 6000 beneath the bottommost production cylinder or unit. In this example, feed cylinder assembly 6000 is separated vertically into two chambers or cylinders 6100, 6200. A collecting tube 6004 extends into two chambers 6100 and 6200 of the feed cylinder assembly 6000. In one example, a block 6050 is disposed, preventing direct flow from collecting tube 6004 into production tube 2, for example when the same physical pipe is used for production tube 2 and the collection tube 6004. In one example, the chambers or cylinders 6100, 6200 are partially isolated from each other by an annular ring 6150, disposed vertically between the pipe 1 and the collecting tube 6004, forming a partial barrier to control the vertical flow between the two chambers or cylinders. In one example, small orifices or tube stubs 6051 are disposed in the annular ring 6150, allowing some fluid flow from chamber or cylinder 6200 into chamber or cylinder 6100.

In one example, the bottom of chamber or cylinder 6200 has a make-up for connection to other fluid pre-processing apparatus. In one example, the bottom of chamber or cylinder 6200 is open to the well bore for receiving or drawing fluids.

In one example, upper chamber 6100 has an orifice 6005 in the tube 6004 and the lower chamber 6200 has several smaller orifices 6006 in the tube 6004. In one example, orifice 6005 is vertical elongate capsule shaped. Small orifices 6006 allow fluids to pass from the lower chamber 6200 to the upper chamber 6100. The lower opening of transport tube 4 of the bottommost production cylinder or unit opens into the upper chamber 6100 of the feed cylinder assembly 6000 for receiving production fluid for transport to a pressure loss cylinder 100 at the top of the tool (not illustrated in this figure). The production tube 2 is blocked at the bottom of the bottommost production cylinder or unit, block 6050. Production tube 2 does not directly communicate with feed cylinder assembly 6000 and does not directly communicate with collecting tube 6004. Rather, fluids are drawn through the production cylinders, first, then enter the production tube 2 through one or more common thief jets 10. In one example, the several smaller orifices 6006 in the tube 6004 serve to filter large particulates.

Examples of Gas Separation Operation.

In one example, a method for separating of gas from liquids in a wellbore includes:
  deploying a production pipe in the well bore, whereby a well bore annulus is formed,
  isolating formation fluids in the wellbore annulus at a vertical location,
  transporting isolated formation fluids (in one example, from below the vertical location) to a chamber located above the vertical location (e.g., in one example, the pressure loss cylinder),
  accumulating the transported isolated formation fluids in the chamber,
  separating, in the chamber, gas bubbles from the transported isolated formation fluids in the chamber,
  expelling the gas bubbles from the chamber into the wellbore annulus above, whereby the transported isolated formation fluids in the chamber become partially degassed,
  jetting, below the expelling gas bubbles, the partially degassed fluids from the chamber into the wellbore annulus,
  drawing the partially degassed fluids from the wellbore annulus into an upper portion of one or more isolated chambers (e.g., in one example, production cylinders), the isolated chambers positioned beneath the accumulating chamber, and
  drawing, from a bottom portion of the one or more isolation chambers, fluids into the production pipe through a jetting port.

In a further example, the method for separating of gas from liquids in a wellbore further includes reducing the rate of fluid flow into each isolated chamber by stacking at least two or more isolated chambers vertically along the production pipe, each isolated chamber feeding fluids from a bottom portion through a jetting port into the production pipe.

In a further example, the method for separating of gas from liquids in a wellbore further includes isolating vertically each isolated chamber from each other, except by way of the jetted ports into the production pipe and by way of drawing the partially degassed fluids from the wellbore annulus into an upper portion of each of the one or more isolated chambers.

In one example, a method for separating of gas from liquids in a wellbore includes:
  deploying a shrouded production pipe in the well bore, whereby a well bore annulus is formed,
  isolating fluids in a lower section of the wellbore from the wellbore annulus above,
  accumulating a vertical column of the isolated fluids (in the shrouded production pipe),
  directing an upper portion of the accumulated vertical column of the isolated fluids upward into an upper portion of a chamber disposed above the vertical column of the isolated fluids,
  directing a lower portion of the accumulated vertical column of the isolated fluids upward into a lower portion of the chamber disposed above the vertical column of the isolated fluids,
  dumping the upper portion fluids into the top of the tool,
  dumping the lower portion fluids into the top of the tool, below the dumped upper portion fluids,
  coalescing gases, in the chamber, from the dumped fluids,
  accumulating partially-degassed fluids, in the chamber, from the dumped fluids,
  venting coalesced gases from the chamber into the wellbore, and
  jetting partially-degassed fluids from the chamber into the wellbore.

In a further example, the method for separating of gas from liquids in a wellbore further includes collecting the partially-degassed fluids in the wellbore into one or more second separation chambers (e.g., in one example, production chambers) disposed beneath the first separation chamber (e.g., in one example, the pressure loss cylinder), the partially-degassed fluids entering an upper portion of each second separation chamber and drawing fluids from a bottom portion of each of the one or more second separation chambers through a port into the production pipe.

In a further example, the port into the production pipe is placed beneath the one or more second separation chambers.

In a further example, the method for separating of gas from liquids in a wellbore further includes where isolating fluids in a lower section of the wellbore from the wellbore annulus above comprises a longitudinally flexible packer disposed in the wellbore annulus between the wellbore wall and the shrouded production pipe.

In one example, a method for separating of gas from liquids in a wellbore includes:
  receiving wellbore fluids into two or more production separation chambers, operating in parallel,
  receiving production separation chamber fluids into a production pipe through a thief jet port disposed in a lower portion of each two or more production separation chambers, and
  extracting bottom hole gas fluids in the wellbore from under the two or more production separation chambers and disposing the gas fluids back into the wellbore above the two or more production separation chambers.

In one example, a method for separating of gas from liquids in a wellbore includes:
  receiving wellbore fluids into two or more production separation chambers, operating in parallel,
  receiving production separation chamber fluids into a production pipe through a thief jet port disposed in a lower portion of each production separation chamber, and
  extracting bottom hole gas fluids in the wellbore from under the two or more production separation chambers and disposing the gas fluids back into the wellbore above the two or more production separation chambers.

Conclusion.

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

I claim:

1. A method for separating of gas from liquids in a wellbore, comprising:
   deploying a production pipe in the well bore, whereby a well bore annulus is formed,
   isolating formation fluids in the wellbore annulus at a vertical location,
   transporting isolated formation fluids to an accumulating chamber located above the vertical location,
   accumulating the transported isolated formation fluids in the accumulating chamber,
   separating, in the accumulating chamber, gas bubbles from the transported isolated formation fluids in the accumulating chamber,
   expelling the gas bubbles from the accumulating chamber into the wellbore annulus above, whereby the transported isolated formation fluids in the accumulating chamber become partially degassed,
   jetting, below the expelling gas bubbles, the partially degassed fluids from the accumulating chamber into the wellbore annulus,
   drawing the partially degassed fluids from the wellbore annulus into an upper portion of one or more isolated chambers, the isolated chambers positioned beneath the accumulating chamber, and
   drawing, from a bottom portion of the one or more isolation chambers, fluids into the production pipe through a jetting port.

2. The method for separating of gas from liquids in a wellbore of claim 1, comprising:
   reducing the rate of fluid flow into each isolated chamber by stacking at least two or more isolated chambers vertically along the production pipe, each isolated chamber feeding fluids from a bottom portion through a jetting port into the production pipe.

3. The method for separating of gas from liquids in a wellbore of claim 1, comprising:
   isolating vertically each isolated chamber from each other, except by way of the jetted ports into the production pipe and by way of drawing the partially degassed fluids from the wellbore annulus into an upper portion of each of the one or more isolated chambers.

4. A method for separating of gas from liquids in a wellbore, comprising:
   deploying a shrouded production pipe in the well bore, whereby a well bore annulus is formed,
   isolating fluids in a lower section of the wellbore from the wellbore annulus above,
   accumulating a vertical column of the isolated fluids,
   directing an upper portion of the accumulated vertical column of the isolated fluids upward into an upper portion of a chamber disposed above the vertical column of the isolated fluids,
   directing a lower portion of the accumulated vertical column of the isolated fluids upward into a lower portion of the chamber disposed above the vertical column of the isolated fluids,
   dumping the upper portion fluids into the upper portion of the chamber, dumping the lower portion fluids into the lower portion of the chamber, below the dumped upper portion fluids,
   coalescing gases, in the chamber, from the dumped fluids,
   accumulating partially-degassed fluids, in the chamber, from the dumped fluids,
   venting coalesced gases from the chamber into the wellbore, and
   jetting partially-degassed fluids from the chamber into the wellbore.

5. The method for separating of gas from liquids in a wellbore of claim 4, comprising:
   collecting the partially-degassed fluids in the wellbore into one or more second separation chambers disposed beneath the first separation chamber, the partially-degassed fluids entering an upper portion of each second separation chamber and drawing fluids from a bottom portion of each of the one or more second separation chambers through a port into the production pipe.

6. The method for separating of gas from liquids in a wellbore of claim 5, wherein the port into the production pipe is disposed beneath the one or more second separation chambers.

7. The method for separating of gas from liquids in a wellbore of claim 4, wherein isolating fluids in a lower section of the wellbore from the wellbore annulus above comprises a longitudinally flexible packer disposed in the wellbore annulus between the wellbore wall and the shrouded production pipe.

8. A method for separating of gas from liquids in a wellbore, comprising:
   receiving wellbore fluids into two or more production separation chambers, operating in parallel,
   receiving production separation chamber fluids into a production pipe through a thief jet port disposed in a lower portion of each two or more production separation chambers, and
   extracting bottom hole gas fluids in the wellbore from under the two or more production separation chambers and disposing the gas fluids back into the wellbore above the two or more production separation chambers.

9. The method for separating of gas from liquids in a wellbore of claim 8 wherein the two or more production separation chambers is four production separation chambers.

10. An apparatus for separating of gas from liquids in a wellbore, comprising:
   a production pipe for deploying in the well bore, whereby a well bore annulus is formed,
   a pressure loss cylinder disposed in the production pipe;
   a plurality of production separation cylinders stacked beneath the pressure loss cylinder;
   a bottom chamber stacked beneath the plurality of production separation cylinders;
   a production tube disposed in the production pipe between the top of the production pipe and into the bottom chamber;

a thief jet orifice disposed in the production tube in the bottom chamber;

a tube traversing from below the plurality of production separation cylinders into the pressure loss cylinder, the tube configured to draw formation fluids into the pressure loss cylinder;

an upper orifice disposed in an upper portion of the pressure loss cylinder opening into the well bore annulus, the upper orifice configured to expel gaseous fluids in the pressure loss cylinder;

a lower orifice disposed in a lower portion of the pressure loss cylinder, below the upper orifice, opening into the well bore annulus, the lower orifice configured to expel partially de-gassed fluids in the pressure loss cylinder;

an upper orifice disposed in an upper portion of each of the plurality of production separation cylinders, opening into the well bore annulus, the upper orifice configured to expel gaseous fluids in the production separation cylinder;

a lower orifice disposed beneath the upper orifice of the production separation cylinder, opening into the well bore annulus, the lower orifice configured to draw partially de-gassed fluids from the wellbore annulus into the production separation cylinder;

a tube connecting the plurality of production separation cylinders, having an orifice in a bottom portion of each production separation cylinders and exiting into the bottom chamber, the tube configured to draw degassed fluids in the lower portions of each production separation cylinder into the production tube.

* * * * *